United States Patent
Torii et al.

(10) Patent No.: US 9,696,064 B2
(45) Date of Patent: Jul. 4, 2017

(54) THERMO-MAGNETISM CYCLE APPARATUS

(71) Applicant: DENSO CORPORATION, Kariya, Aichi-pref. (JP)

(72) Inventors: Akito Torii, Okazaki (JP); Naoki Watanabe, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 275 days.

(21) Appl. No.: 14/579,177

(22) Filed: Dec. 22, 2014

(65) Prior Publication Data

US 2015/0184902 A1    Jul. 2, 2015

(30) Foreign Application Priority Data

Dec. 26, 2013  (JP) ................................. 2013-268745

(51) Int. Cl.
F25B 21/00        (2006.01)

(52) U.S. Cl.
CPC ...... F25B 21/00 (2013.01); *F25B 2321/0023* (2013.01); *Y02B 30/66* (2013.01)

(58) Field of Classification Search
CPC ... F25B 21/00; F25B 2321/0023; Y02B 30/66
USPC .......................................................... 62/3.1
See application file for complete search history.

(56) References Cited

U.S. PATENT DOCUMENTS

| | | | |
|---|---|---|---|
| 2007/0144181 A1* | 6/2007 | Kitanovski et al. | .... F25B 21/00 62/3.1 |
| 2011/0173993 A1 | 7/2011 | Muller et al. | |
| 2011/0289937 A1 | 12/2011 | Muller et al. | |
| 2012/0266591 A1 | 10/2012 | Morimoto et al. | |
| 2012/0285179 A1 | 11/2012 | Morimoto et al. | |

FOREIGN PATENT DOCUMENTS

| | | |
|---|---|---|
| JP | 2012-503754 | 2/2012 |
| JP | 2012-518149 | 8/2012 |
| JP | 2012-229634 | 11/2012 |
| JP | 2012-255642 | 12/2012 |

* cited by examiner

*Primary Examiner* — Len Tran
*Assistant Examiner* — Ana Vazquez
(74) *Attorney, Agent, or Firm* — Harness, Dickey & Pierce, P.L.C.

(57) ABSTRACT

A thermo-magnetism cycle apparatus has a first magneto-caloric element (MCE) element on a low temperature side and a second MCE element on a high temperature side. A first heat transfer medium flows in the first MCE element and a second heat transfer medium flows in the second MCE element. A third MCE element has a first flow passage that flows the first heat transfer medium and a second flow passage that flows the second heat transfer medium. The third MCE element absorbs heat from the first heat transfer medium utilizing a magneto-caloric process and dissipates the absorbed heat partially to the second heat transfer medium. As such, the third MCE element actively transfers heat between the two heat transfer media via the magneto-caloric process. The third MCE element also passively transfers heat between the two heat transfer media.

9 Claims, 10 Drawing Sheets

THERMO-MAGNETISM CYCLE APPARATUS

CROSS REFERENCE TO RELATED APPLICATION

The present application is based on and claims the benefit of priority of Japanese Patent Application No. 2013-268745, filed on Dec. 26, 2013, the disclosure of which is incorporated herein by reference.

TECHNICAL FIELD

The present disclosure generally relates to a thermo-magnetism cycle apparatus utilizing a magneto-caloric effect type heat pump.

BACKGROUND INFORMATION

Generally, a thermo-magnetism cycle apparatus is used as a heat pump or heat engine. Patent documents 1 to 4 (i.e., Patent document 1: Japanese Patent Laid-Open No. 2012-255642; Patent document 2: Japanese Patent Laid-Open No. 2012-229634; Patent document 3: Japanese Patent Laid-Open No. 2012-503754; Patent document 4: Japanese Patent Laid-Open No. 2012-518149) respectively disclose a thermo-magnetism cycle apparatus using temperature characteristics of a magnetic body. As a heat pump, the apparatus provides either a low temperature or removes heat via a changing of a magnetic field. As a heat engine, the apparatus removes thermal energy via the changing of the magnetic field caused by a temperature difference.

Further, the patent document 4 provides an apparatus which transfers heat by using respectively different heat transfer media in a high temperature region and a low temperature region. In the proposed apparatus, a heat exchange device is used to exchange heat between the two media. The heat exchange device is a heat conductive member arranged between the two media. With such a configuration, heat in the proposed apparatus is transferred through a heat conductive member having a rod shape.

The heat conductive member disclosed in the patent document 4 transfers heat only by heat conduction. Such a configuration results in undesired heat loss in the thermo-magnetism cycle apparatus. That is, the heat conductive member must have a partial reverse temperature gradient provided therein, which is a reverse gradient relative to the main temperature gradient between a low temperature end and a high temperature end.

For example, as shown in FIG. 1, a heat pump apparatus provided with a first unit 11a on a low temperature side and a second unit 11b on a high temperature side is considered. When heat transfer between the two units is provided only by the heat conductive member, a temperature distribution may look like a broken line CMP, together with temperature T1 and T2c on both ends of the heat conductive member. Due to the heat conduction therebetween, a relationship of temperature T1 and temperature T2c is T1>T2c. However, a partial temperature gradient of T1>T2c is a reverse gradient relative to a main temperature gradient of TC<THc, which is a gradient between TC (i.e., a low-temp end temperature) and THc (i.e., a high-temp end temperature). As a result, such a thermo-magnetism cycle apparatus has a deteriorated efficiency.

From another viewpoint, a long rod-shaped heat conductive member in the patent document 4 is not capable of providing efficient heat exchange between two media. Therefore, the efficiency as a thermo-magnetism cycle apparatus decreases. For example, the difference of temperature made in the heat pump is small. Also, the power obtained from the engine is small.

From the above-mentioned viewpoint and/or from the other viewpoints, thermo-magnetism cycle apparatus is required to have a further improvement.

SUMMARY

It is an object of the present disclosure to provide a thermo-magnetism cycle apparatus which establishes an efficient heat transfer between two media.

It is another object of the present disclosure to provide a thermo-magnetism cycle apparatus which transfers heat between two media not only by heat conduction but also by other means.

It is yet another object of the present disclosure to provide a thermo-magnetism cycle apparatus which reduces or diminishes a partially-reverse temperature gradient that is a reverse gradient relative to the main temperature gradient between the two media.

The present disclosure disclose herein adopts the following technical means to achieve the above-described objects. The numerals in the following and in the claims are intended to indicate an exemplary correspondence to concrete devices and objects in the following embodiments, thereby not restricting in any sense of the technical scope of the present disclosure.

In an aspect of the present disclosure, a thermo-magnetism cycle apparatus is provided. The thermo-magnetism cycle apparatus includes a magneto-caloric element having a low-temp end and a high-temp end, the low-temp end disposed opposite to the high-temp end, a heat transfer device that reciprocally flows a heat transfer medium inside of the magneto-caloric element to transfer heat between the heat transfer medium and the magneto-caloric element, and a magnetic field modulator that reciprocally applies and removes a magnetic field to the magneto-caloric element in synchronization with reciprocal flowing of the heat transfer medium. The magneto-caloric element includes a first magneto-caloric element, a second magneto-caloric element disposed on a high-temp side of the first magneto-caloric element, and a third magneto-caloric element disposed at a position between the first and second magneto-caloric elements. The heat transfer medium includes a first heat transfer medium that exchanges heat with the first magneto-caloric element, and a second heat transfer medium that exchanges heat with the second magneto-caloric element, the first heat transfer medium and the second heat transfer medium provided as two respectively different media The third magneto-caloric element includes a first passage through which the first heat transfer medium flows, and a second passage through which the second heat transfer medium flows. As such, heat is passively transferred between the first and second heat transfer media through heat conduction, and is actively transferred between the first and second heat transfer media through a magneto-caloric effect.

In another aspect of the present disclosure, a thermo-magnetism cycle apparatus includes a magneto-caloric element having a low-temp end and a high-temp end, the low-temp end disposed opposite to the high-temp end, a heat transfer device that reciprocally flows a heat transfer medium inside of the magneto-caloric element to transfer heat between the heat transfer medium and the magneto-caloric element, and a magnetic field modulator that reciprocally applies and removes a magnetic field to the magneto-caloric element in synchronization with reciprocal flowing of the heat transfer medium. The magneto-caloric element includes a first magneto-caloric element, a second magneto-caloric element disposed on a high-temp side of the first magneto-caloric element. The heat transfer device includes a first heat transfer medium that exchanges heat with the first magneto-caloric element, a second heat transfer medium that exchanges heat with the second magneto-caloric element, the first heat transfer medium and the second heat transfer medium provided as two respectively different media, and a heat exchanger disposed at a position between the first and second magneto-caloric element, the heat exchanger including a first passage through which the first heat transfer medium flows, and a second passage through which the second heat transfer medium flows. The first and second passages are arranged side-by-side within the heat exchanger and combined to form a comingling passage structure with a dividing wall interposed therebetween, and the first and second passages are layered to form a plurality of comingling passage structures.

According to such configuration, the first magneto-caloric element located on the low temperature side and the second magneto-caloric element located on the high temperature side have respectively different heat transfer media flowing therein. Therefore, a medium suitable for the low temperature side and a medium suitable for the high temperature side are respectively used on both sides. Further, in the third magneto-caloric element arranged in between the first magneto-caloric element and the second magneto-caloric element, both of the first passage for the first heat transfer medium and the second passage for the second heat transfer medium are disposed. In such configuration, due to its own magneto-caloric effect, the third magneto-caloric element absorbs heat from the first heat transfer medium, and transfers a part of the absorbed heat to the second heat transfer medium. Therefore, the third magneto-caloric element provides heat transfer from the first heat transfer medium to the second heat transfer medium according to its own magneto-caloric effect. As a result, an active heat transfer is provided between a low-temp side stage on the low temperature side including the first magneto-caloric element and a high-temp side stage on the high temperature side including the second magneto-caloric element. Further, the third magneto-caloric element provides a passive heat transfer from the first heat transfer medium to the second heat transfer medium passively as a heat conduction, when temperature (T1) of the first heat transfer medium is higher than temperature (T2) of the second heat transfer medium (T1>T2).

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
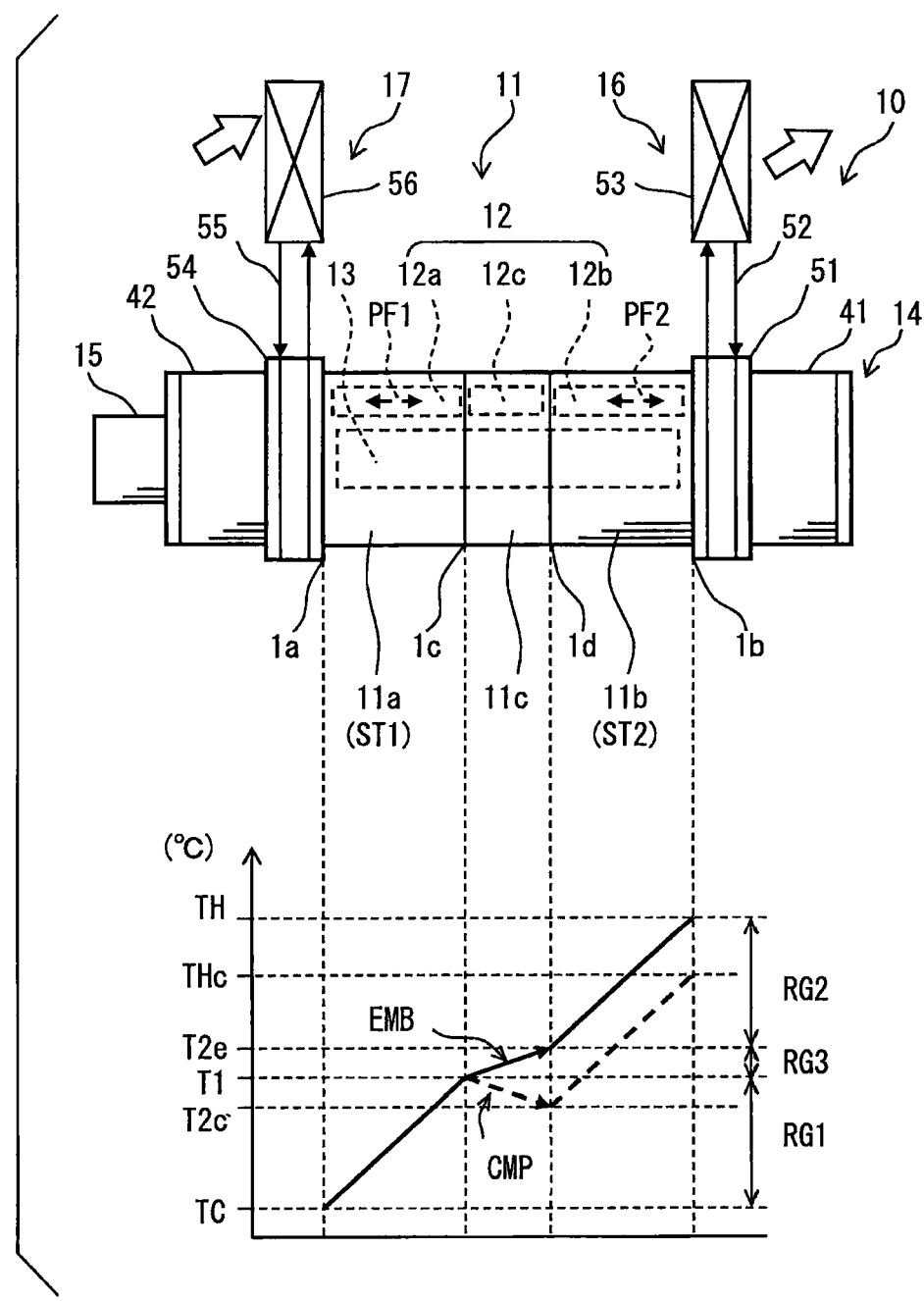
FIG. 1 is a block diagram of a magneto-caloric effect type heat pump apparatus (henceforth MHP apparatus) in a first embodiment of the present disclosure.

Embodiments for implementing the present disclosure are described with reference to the drawings. In each of the embodiments, the preceding matter has the same reference numeral, and the description of the same matter may not be repeated. In the succeeding embodiments, a numeral having an additional preceding first digit (i.e., 1xx) may be used for indicating similarity to the preceding matter or object. When a configuration is described partially, a non-described other part may be utilized from a different embodiment.

First Embodiment

FIG. 1 is a block diagram of an air-conditioner 10 for vehicles concerning the first embodiment for implementing the present disclosure. The air-conditioner 10 for vehicles is provided with a magneto-caloric effect type heat pump apparatus 11. The magneto-caloric effect type heat pump apparatus 11 is also designated as a Magneto-caloric effect Heat Pump (MHP) apparatus 11. The MHP apparatus 11 serves as a thermo-magnetism cycle apparatus.

In this specification, the "heat pump apparatus" is used to convey a broad meaning. That is, the "heat pump apparatus" may mean both of an apparatus using a cold energy obtained by the heat pump apparatus and an apparatus using a heat energy obtained by the heat pump apparatus. The apparatus using the cold energy may also be designated as a refrigerating cycle device. Therefore, in this specification, the phrase "heat pump apparatus" is used as conceptually including a refrigerating cycle device.

The MHP apparatus 11 is provided with a magneto-caloric element 12. The magneto-caloric element 12 is disposed at a position between a low temperature end 1a and a high temperature end 1b. The MHP apparatus 11 uses the magneto-caloric effect of the magneto-caloric element 12. The magneto-caloric element 12 is also designated as an MCE (Magneto-Caloric Effect) element 12. The MCE element 12 generates heat and absorbs heat in response to the change of strength/intensity of the external magnetic field. The MCE element 12 generates heat by an application of the external magnetic field, and absorbs heat by a removal of the external magnetic field. When the MCE element 12 has a reduced magnetic entropy when the external magnetic field is applied thereto and electron spins are aligned to the magnetic field direction, thereby radiating heat and having an increased temperature. When the external magnetic field is removed from the MCE element 12, the electron spins are disoriented and the magnetic entropy will be increased, thereby absorbing heat and having a temperature fall. The MCE element 12 is made of a magnetic body which demonstrates a high magneto-caloric effect in a normal temperature region. For example, a "gadolinium" including material or a lantern iron-silicon compound may be used for such purpose. Further, a mixture of manganese, iron, phosphorus, and germanium may also be used.

The MHP apparatus 11 is provided with a magnetic field modulator 13 and a heat transfer device 14 for operating the MCE element 12 as an AMR (Active Magnetic Refrigeration) cycle.

The magnetic field modulator 13, while applying the external magnetic field to the MCE element 12, increases and decreases the intensity of such external magnetic field. The magnetic field modulator 13 cyclically switches between a magnetize state and a demagnetize state of the MCE element 12, in which the MCE element 12 is either put in a strong magnetic field or in a weak/zero magnetic field. The magnetic field modulator 13 modulates the external magnetic field to alternately create, i.e., to cyclically repeat, a magnetize period during which the MCE element 12 is kept/held in a strong external magnetic field and a demagnetize period during which the MCE element 12 is kept/held in a weaker magnetic field that is weaker than the one in the magnetize period. The magnetic field modulator 13 repeats application and removal of the magnetic field to/from the MCE element 12 in synchronization with the reciprocal flow of the heat transfer medium mentioned below. The magnetic field modulator 13 is provided with the magnetic force source that generates the external magnetic field, i.e., a permanent magnet or an electro-magnet.

The heat transfer device 14 is provided with (i) a heat transfer medium for transferring heat that is either absorbed by or radiated from the MCE element 12 and (ii) a fluid handling apparatus for moving/flowing the heat transfer medium. The heat transfer device 14 is an apparatus that transfers or flows the heat transfer medium along, e.g., in an inside of, the MCE element 12 which exchanges heat with the MCE element 12. The heat transfer device 14 has a first heat transfer medium PF1 that flows, or is circulated, to exchange heat with a first MCE element 12a and a second heat transfer medium PF2 that flows, or is circulated, to exchange heat with a second MCE element 12b. The first heat transfer medium PF1 and the second heat transfer medium PF2 are provided as respectively different heat transfer media. The heat transfer device 14 flows/circulates the heat transfer media PF1 and PF2 in a reciprocal manner for exchanging heat with the MCE element 12. The heat transfer device 14 generates a reciprocal flow of the heat transfer media PF1 and PF2 in synchronization with the change (i.e., an increase and a decrease) of the external magnetic field by the magnetic field modulator 13. The heat transfer device 14 moves the heat transfer media PF1 and PF2 in a reciprocal manner in synchronization with the change of the magnetic field by the magnetic field modulator 13.

The heat transfer media PF1 and PF2 which exchanges heat with the MCE element 12 are also designated (i.e., categorized) as primary media PF1 and PF2. The primary media PF1 and PF2 may be provided as a fluid, e.g. an antifreeze solution, water, oil or the like. The heat transfer device 14 may include a pump for flowing/circulating a heat transfer medium. The heat transfer device 14 is provided with pumps 41 and 42 for flowing/circulating a primary medium. The pumps 41 and 42 supply a reciprocal flow of the primary media PF1 and PF2 to one MCE element 12. The pumps 41 and 42 are disposed on both ends of one MCE element 12. The pumps 41 and 42 are provided with multiple cylinders. In the pumps 41 and 42, paired cylinders are configured to reciprocally perform an intake process and a discharge process.

The MHP apparatus 11 is provided with a motor 15 that serves as a power source. The motor 15 is a power source of the magnetic field modulator 13. The motor 15 is also a power source of the heat transfer device 14.

The MHP apparatus 11 is provided with a high temperature system 16 which transfers "high temperature" created by the MHP apparatus 11. The high temperature system 16 is also an apparatus that uses the high temperature created by the MHP apparatus 11. The MHP apparatus 11 is provided with a low temperature system 17 which transfers "low temperature" created by the MHP apparatus 11. The low temperature system 17 is also an apparatus that uses the low temperature created by the MHP apparatus 11.

The high temperature system 16 is provided with a heat exchanger 51 which provides heat exchange between a primary medium and a secondary medium. The secondary medium is a heat transfer medium used to transfer heat in the high temperature system 16. The secondary medium may be provided as a fluid, e.g. an antifreeze solution, water, oil or the like. The high temperature system 16 is provided with a flow passage 52 in which the secondary medium is circulated cyclically. The high temperature system 16 is provided with a heat exchanger 53 which provides heat exchange between the secondary medium and other media. For example, the heat exchanger 53 provides heat exchange between the secondary medium and air. The high temperature system 16 is also an apparatus for taking heat away from the high temperature end of the MHP apparatus 11 and for cooling the high temperature end thereof.

The low temperature system 17 is provided with a heat exchanger 54 which provides heat exchange between the primary medium and the secondary medium. The secondary medium is a heat transfer medium used to transfer heat in the low temperature system 17. The secondary medium may be provided as a fluid, e.g. an antifreeze solution, water, oil or the like. The low temperature system 17 is provided with a flow passage 55 in which the secondary medium is circulated cyclically. The low temperature system 17 is provided with a heat exchanger 56 which provides heat exchange between the secondary medium and other media. For example, the heat exchanger 56 provides heat exchange between the secondary medium and air. The low temperature system 17 is also an apparatus for bringing heat into the low temperature end of the MHP apparatus 11 and for heating the low temperature end thereof.

The air-conditioner 10 for vehicles is installed in a vehicle, and adjusts temperature of a passenger room in the vehicle. Two heat exchangers 53 and 56 are provided as a part of the air-conditioners 10 for vehicles. The heat exchanger 53 is the high temperature side heat exchanger 53 whose temperature becomes higher than the heat exchanger 56. The heat exchanger 53 is also designated as an interior heat exchanger 53. The heat exchanger 56 is the low temperature side heat exchanger 56 whose temperature becomes lower than the heat exchanger 53. The heat exchanger 56 is also designated as an exterior heat exchanger 56. The air-conditioner 10 for vehicles is provided with an air processing apparatus, e.g. an air-conditioning duct, a blower, and the like which make the high temperature side heat exchanger 53 and/or the low temperature side heat exchanger 56 available for the air-conditioning of the passenger room.

The air-conditioner 10 for vehicles is used as an air conditioner or a heater. The air-conditioner 10 for vehicles may be provided with a cooler which cools the air supplied to the passenger room, and may also be provided with a heater which re-heats the cooled air cooled by the cooler. The MHP apparatus 11 is used as a cold energy source in the air-conditioner 10 for vehicles, or a heat energy source thereof. That is, the high temperature side heat exchanger 53 may be used as the above-mentioned heater. The low temperature side heat exchanger 56 may be used as the above-mentioned cooler.

When the MHP apparatus 11 is used as a heat energy source, the air passing through the high temperature side heat exchanger 53 is supplied to the passenger room, and is used for heating. At this time, the air passing through the low temperature side heat exchanger 56 is discharged to an outside of the vehicle.

When the MHP apparatus 11 is used as a cold energy source, the air passing through the low temperature side heat exchanger 56 is supplied to the passenger room, and is used for cooling. At this time, the air passing through the high temperature side heat exchanger 53 is discharged to an outside of the vehicle.

The MHP apparatus 11 may also be used as a dehumidifier. In such case, the air having passed through the low temperature side heat exchanger 56 passes through the high temperature side heat exchanger 53, and is supplied to the passenger room. The MHP apparatus 11 is used as a heat energy source in winter and in summer.

FIG. 1 illustrates a temperature distribution in the apparatus which represents one of many operation states of the MHP apparatus 11. In the drawing, a vertical axis shows temperature (degree Celsius), and a horizontal axis shows a position of each part of the apparatus. A solid line EMB shows an example of the temperature distribution in one operation state in the present embodiment. A dashed line CMP shows an example of the temperature distribution in a comparative example in which a third unit 11c of the MHP apparatus 11 is provided as a long and thin heat conductive member.

The MHP apparatus 11 has the low temperature end 1a by which creates low temperature and the high temperature end 1b which creates high temperature. The MHP apparatus 11 is provided with plural magneto-caloric effect (MCD: Magneto-Caloric effect Device) units 11a, 11b, 11c at a position between the low temperature end 1a and the high temperature end 1b. The magneto-caloric effect units 11a, 11b, 11c are also simply designated as units 11a, 11b, 11c or also as a heat module. The MHP apparatus 11 thus has the first unit 11a, the second unit 11b, and the third unit 11c.

Three units 11a, 11b, 11c are arranged in series between the low temperature end 1a and the high temperature end 1b. The first unit 11a provides the low temperature end 1a. The first unit 11a is positioned between the low temperature end 1a and a middle-low temperature end 1c.

The second unit 11b provides the high temperature end 1b. The second unit 11b is positioned between the high temperature end 1b and a middle-high temperature end 1d.

The third unit 11c positioned between the two units 11a and 11b. The third unit 11c connects the two units 11a and 11b mechanically and thermally.

The first unit 11a takes charge of a first temperature zone RG1 on the low temperature side in an entire temperature zone RG provided by the MHP apparatus 11. The first unit 11a transfers heat towards the middle-low temperature end 1c from the low temperature end 1a. In other words, the first unit 11a acts as a heat pump in the first temperature zone RG1. The first unit 11a is configured to be highly-efficiently operable in the first temperature zone RG1.

The first unit 11a has the first MCE element 12a that provides a high magneto-caloric effect at a position between the low temperature end 1a and the middle-low temperature end 1c. The first MCE element 12a may be provided as several elements that have respectively different temperature zones in which their high magneto-caloric effect are exerted. The first unit 11a is provided with the primary medium PF1 for low temperature which is suitably used in the first temperature zone RG1. The primary medium PF1 must have the following characteristics, i.e., non-freezing, non-boiling, high heat exchange capacity, a low hydrodynamic loss, etc. For example, the primary medium PF1 may be a fluid which has, in the first temperature zone RG1, a relatively low viscosity that yields only a low pressure loss. Since the first temperature zone RG1 is a zone at a relatively low temperature, a non-freezing fluid which does not freeze is selected as the primary medium PF1. In the present embodiment, the primary medium PF1 is an antifreeze solution.

The second unit 11b takes charge of a second temperature zone RG2 on the high temperature side in the entire temperature zone provided by the MHP apparatus 11. The second temperature zone RG2 is positioned on the high temperature side of the first temperature zone RG1. The first temperature zone RG1 and the second temperature zone RG2 may partially overlap. In this case, at least a part of the second temperature zone RG2 occupies a temperature zone that is higher than the first temperature zone RG1. The second temperature zone RG2 may be entirely higher than the first temperature zone RG1. The second unit 11b transfers heat from the middle-high temperature end 1d to the high temperature end 1b. In other words, the second unit 11b acts as a heat pump in the second temperature zone RG2. The second unit 11b is configured to highly-efficiently operate in the second temperature zone RG2.

The second unit 11b has the second MCE element 12b that provides a high magneto-caloric effect between the middle-high temperature end 1d and the high temperature end 1b. The second MCE element 12b is arranged from the first MCE element 12a at the high temperature side. The second MCE element 12b may be provided as several elements that have respectively different temperature zones in which their high magneto-caloric effect are exerted. The second unit 11b is provided with the primary medium PF2 for high temperature which is suitably used in the second temperature zone RG2.

The primary medium PF2 must have the following characteristics, i.e., non-freezing, non-boiling, high heat exchange capacity, a low hydrodynamic loss, etc. For example, the primary medium PF2 may be a fluid which has, in the second temperature zone RG2, a relatively low viscosity that yields only a low pressure loss. Since the second temperature zone RG2 is a zone at a relatively high temperature, a non-boiling fluid which does not boil is selected as the primary medium PF2. In the present embodiment, the primary medium PF2 is water. The primary medium PF1 and the primary medium PF2 are respectively different media. The primary medium PF1 has the viscosity that is more suitable for the use at low temperature than the primary medium PF2. The primary medium PF2 has the viscosity that is more suitable for the use at high temperature than the primary medium PF1.

The third unit 11c is positioned between the middle-low temperature end 1c and the middle-high temperature end 1d.

Temperature T1 of the middle-low temperature end 1c and temperature T2 of the middle-high temperature end 1d respectively change according to the change of the operation state. The relationship between temperature T1 and temperature T2 may vary, e.g., T1<T2, T1=T2, or T1>T2.

The third unit 11c provides heat transfer between the first unit 11a and the second unit 11b. The third unit 11c transfers heat which is caused at least by heat conduction from the first unit 11a to the second unit 11b. Further, the third unit 11c transfers heat from the first unit 11a to the second unit 11b by its own magneto-caloric effect.

The third unit 11c may take charge of a third temperature zone RG3 that is a middle zone in the entire temperature zone provided by the MHP apparatus 11. The temperature width of the third temperature zone RG3 is smaller than the temperature width of the first temperature zone RG1. The temperature width of the third temperature zone RG3 is smaller than the temperature width of the second temperature zone RG2. The temperature width of the third temperature zone RG3 may be zero or negative in some cases. The third unit 11c transfers heat towards the middle-high temperature end 1d from the middle-low temperature end 1c. In other words, the third unit 11c acts as a heat pump in the third temperature zone RG3. The third unit 11c is configured to be highly-efficiently operable in the third temperature zone RG3.

The third unit 11c has a third MCE element 12c that provides a high magneto-caloric effect at a position between the middle-low temperature end 1c and the middle-high temperature end 1d. The MCE element 12c is also designated as an intermediate element 12c or a connecting element 12c. The third MCE element 12c may be provided as several elements that have respectively different temperature zones in which their high magneto-caloric effect are exerted. The third unit 11c exchanges heat with both of the primary medium PF1 for the first unit 11a and the primary medium PF2 for the second unit 11b. As a result, the primary medium PF1 and the primary medium PF2 are thermally-connected via the MCE element 12c of the third unit 11c.

The MCE element 12c is a magneto-caloric effect element which functions as a part of the AMR cycle. Further, the MCE element 12c is also a heat exchanger which provides heat exchange between the primary medium PF1 and the primary medium PF2.

At a position between the low temperature end 1a and the high temperature end 1b, the first MCE element 12a, the third MCE element 12c, and the second MCE element 12b are arranged in series. These MCE elements 12a, 12b, 12c are connectively arranged, e.g., "conjoined," at a position between the low temperature end 1a and the high temperature end 1b. In other words, the MCE elements 12a, 12b, 12c are heat-transferably connected between the low-temp end and the high-temp end. These MCE elements 12a, 12b, 12c are arranged in mechanical contact with each other. These MCE elements 12a, 12b, 12c may also be arranged in a slightly mechanically-detached manner from each other.

Figure 2:
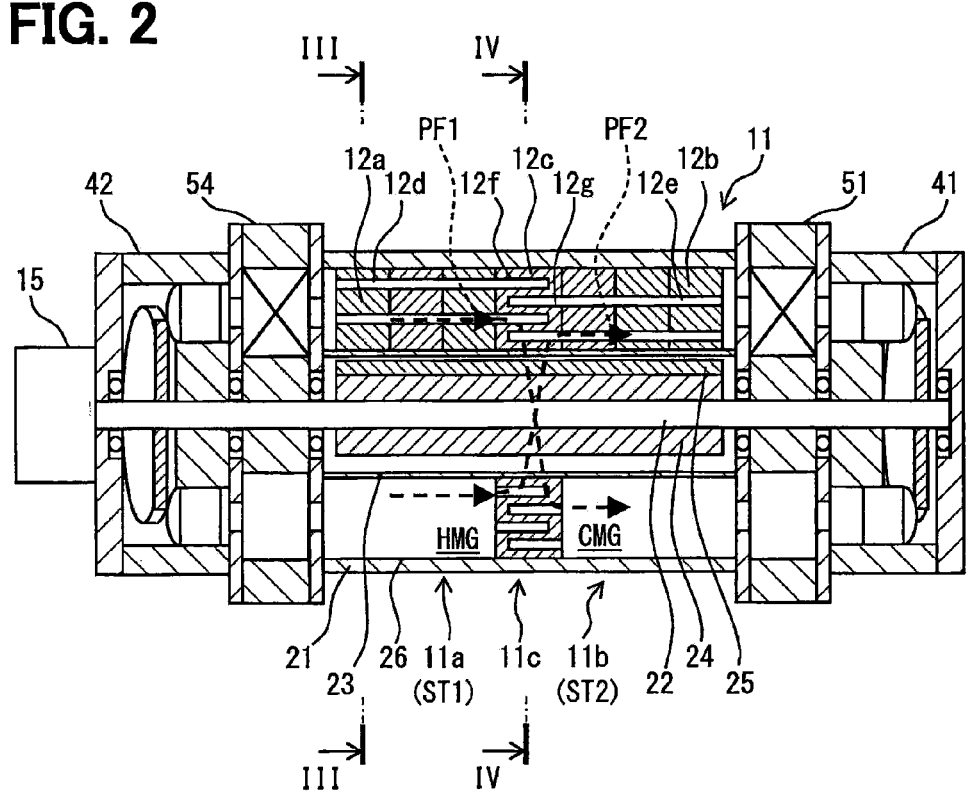
FIG. 2 is a sectional view of the MHP apparatus in the first embodiment.
Figure 3:
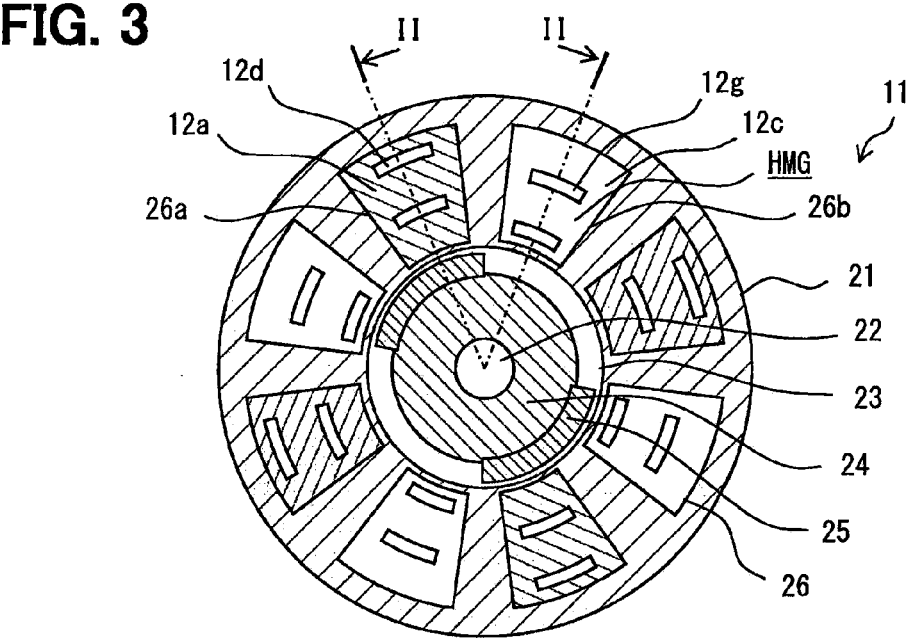
FIG. 3 is a sectional view of the MHP apparatus in the first embodiment.
Figure 4:
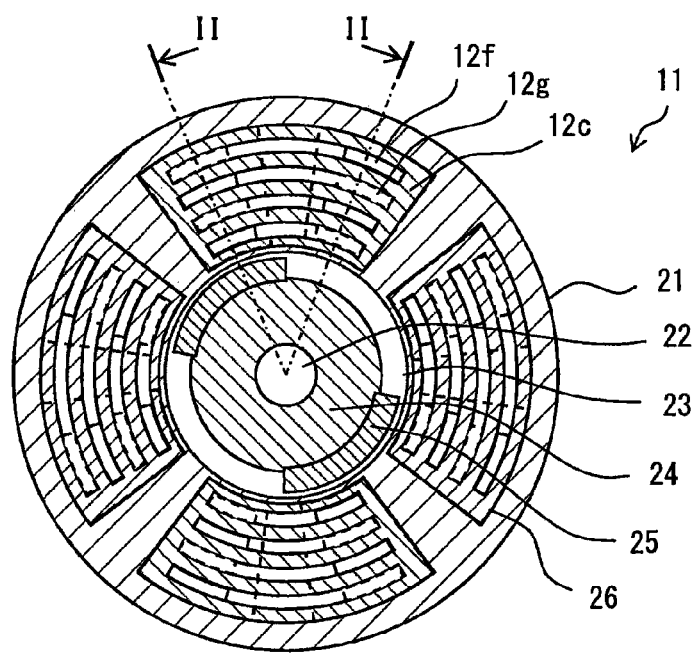
FIG. 4 is a sectional view of the MHP apparatus in the first embodiment.

FIG. 2, FIG. 3, and FIG. 4 respectively show sectional views of an internal structure of the MHP apparatus 11. FIG. 2 shows a II-II line cross section shown in other drawings. FIG. 3 shows a line cross section in other drawings. FIG. 4 shows a IV-IV line cross section in other drawings.

In FIG. 2, the motor 15 is provided as a power source of the MHP apparatus 11. The motor 15 is driven by an in-vehicle battery. The motor 15 rotates a rotator which serves as the magnetic field modulator 13. Thereby, the motor 15 and the magnetic field modulator 13 are coupled to produce (i) a magnetize state in which the external magnetic field is applied to the MCE element 12 and (ii) a demagnetize state in which the external magnetic field is removed from (i.e., not applied to) the MCE element 12, the two states produced in a cyclic and alternating manner. The motor 15 drives the pumps 41 and 42 of the heat transfer device 14. Thereby, the motor 15 and the pumps 41, 42 produce the reciprocal flow of the primary media PF1 and PF2. When a cylinder of the pump 41 is in an intake process and a cylinder of the pump 42 is in a discharge process, the primary media PF1 and PF2 flow along an arrow in FIG. 2.

The pumps 41 and 42 produce the reciprocal flow of the primary media PF1, PF2 in the MHP apparatus 11, for operating the MCE element 12 as an AMR cycle. The pumps 41 and 42 are a positive-displacement type reciprocal flow pump. The pumps 41 and 42 are a swash-plate type piston pump. The pumps 41 and 42 are an axial piston pump having multiple cylinders. The pumps 41 and 42 are an 8-cylinder pump.

The MHP apparatus 11 is provided with a housing 21 which may be designated to have a cylindrical shape or a column shape. The housing 21 rotatably supports a rotation shaft 22 along its center axis. The rotation shaft 22 is connected to an output shaft of the motor 15. The housing 21 defines, around the rotation shaft 22, a housing chamber 23 for accommodating the magnetic field modulator 13. The chamber 23 is a cylindrical space. A rotor core 24 is fixed onto the rotation shaft 22. The rotor core 24 together with the housing 21 serve as a yoke that contains and relays the magnetic flux. The rotor core 24 is configured to have a magnetic flux passing area and a magnetic flux stopping area along its circumference, among which the passing area easily passes the magnetic flux therethrough and the stopping area does not substantially pass the magnetic flux. A permanent magnet 25 is fixed onto the rotor core 24. The permanent magnet 25 is a partially-cylindrical shape, and its section has a fan shape. The permanent magnet 25 is fixed onto an outer peripheral surface of the rotor core 24.

The rotor core 24 and the permanent magnet 25 produce, in its proximity, a magnetic field intensified region and a magnetic field weakened region, among which the intensified region has its external magnetic field provided by the permanent magnet 25 intensified to a certain degree and the weakened region has its external magnetic field provided by the permanent magnet 25 weakened to a certain degree. In the magnetic field weakened region, the intensity of the external magnetic field is nearly equal to zero, i.e., the external magnetic field is almost removed therefrom. The rotor core 24 and the permanent magnet 25 rotate in synchronization with a rotation of the rotation shaft 22. Therefore, the magnetic field intensified region and the magnetic field weakened region rotate in synchronization with a rotation of the rotation shaft 22. As a result, if the intensity of the magnetic field is observed at a certain proximity point of the core 24 and the magnet 25, an intensified period of the magnetic field and a weakened period thereof are reciprocated and repeated. Thus, the rotor core 24 and the permanent magnet 25 serve as the magnetic field modulator 13 which repeats an application and a removal of the external magnetic field. The rotor core 24 and the permanent magnet 25 serve as a switching apparatus which switches an application and a removal of the external magnetic field to/from the MCE element 12. A magnetic field may also be read as a magnetic field in the above and in the following context.

The housing 21 has at least one work chamber 26 defined therein. The work chamber 26 is disposed adjacent to the housing chamber 23. The housing 21 has plural work chambers 26 evenly positioned on a radial outside of the housing chamber 23. In the present embodiment, one housing 21 has eight work chambers 26 defined therein. Each of the work chambers 26 is formed as a column shape space that extends along the axis of the housing 21. One work chamber 26 is formed to correspond to one cylinder of the pump 41 and one cylinder of the pump 42. On both sides of the work chamber 26, two cylinders are arranged.

The work chamber 26 provides/serves as a flow passage in/through which the heat transfer medium, i.e., the primary medium PF1 and PF2, flow/circulate. The primary media PF1 and PF2 flow in the work chamber 26 along its longitudinal direction. The flow of the primary media PF1 and PF2 in an inside of the work chamber 26 is reciprocal along the longitudinal direction of the chamber 26.

Further, the work chamber 26 serves as a housing chamber in which the MCE element 12 is housed. The housing 21 serves as a container in which the work chamber 26 is formed. In the work chamber 26, the MCE element 12 serving as a magnetic working material which has a magneto-caloric effect is disposed.

Two work chambers 26a and 26b in a side-by-side arrangement in FIGS. 3 and 4 serve as one set of work chambers. One set of work chambers 26a and 26b provides/contains one first unit 11a, one second unit 11b, and one third unit 11c. One set of work chambers 26a and 26b are divided into a center portion and two side portions.

In a low temperature side portion of the first work chamber 26a, the MCE element 12a serving as the first unit 11a is housed. The MCE element 12a has multiple division elements. In the drawing, three division elements are illustrated. These division elements are made with a carefully-chosen material and have an appropriate size, in terms of achieving a high magneto-caloric effect in each of the divided temperature zones, i.e., in each of the sub-divisions of the first temperature zone RG1. The MCE element 12a has multiple passages 12d formed therein for flowing/circulating the primary medium PF1, which may be designated as "micro-channels." The passage 12d is formed as a flat/thin shape passage, which has a flat cross section shape. For the ease of viewing, there are only two passages 12d illustrated in the drawing. These passages 12d provide a high heat exchange capacity for exchanging heat between the MCE element 12a and the primary medium PF1.

In a high temperature side portion of the first work chamber 26a, the MCE element 12b serving as the second unit 11b is housed. The MCE element 12b has multiple division elements. In the drawing, three division elements are illustrated. These division elements are made with a carefully-chosen material and have an appropriate size, in terms of achieving a high magneto-caloric effect in each of the divided temperature zones, i.e., in each of the sub-divisions of the second temperature zone RG2. The MCE element 12b has multiple passages 12e formed therein for flowing/circulating the primary medium PF2, which may be designated as "micro-channels." The passage 12e is formed as a flat/thin shape passage, which has a flat cross section shape. For the ease of viewing, there are only two passages 12e illustrated in the drawing. These passages 12e provide a high heat exchange capacity for exchanging heat between the MCE element 12a and the primary medium PF2.

In a low temperature side portion of the second work chamber 26b, a high temperature medium gallery HMG for circulating the primary medium PF2 which serves as the second unit 11b is formed. In the high temperature medium gallery HMG, no MCE element 12 is housed. The high temperature medium gallery HMG communicates with a corresponding cylinder in the pump 42.

In a high temperature side portion of the second work chamber 26b, a low temperature medium gallery CMG for circulating the primary medium PF1 which serves as the first unit 11a is formed. In the low temperature medium gallery CMG, no MCE element 12 is housed. The low temperature medium gallery CMG communicates with a corresponding cylinder in the pump 41.

As shown in FIG. 2, the MCE element 12c serving as the third unit 11c is disposed in a middle portion between the first work chamber 26a and the second work chamber 26b. As shown in FIG. 4, the MCE element 12c is disposed to bridge the first work chamber 26a and the second work chamber 26b, extending along the circumferential direction. For positioning the MCE element 12c, at a position between the first work chamber 26a and the second work chamber 26b, there is a communication portion extending along the circumferential direction.

The MCE element 12c has a low temperature passage 12f which communicates with (i) the passage 12d of the first unit 11a and (ii) the low temperature medium gallery CMG. The MCE element 12c has a high temperature passage 12g which communicates with (i) the passage 12e of the second unit 11b and (ii) the high temperature medium gallery HMG. The MCE element 12c has the first passage 12f in which the first heat transfer medium PF1 is circulated, and has the second passage 12g in which the second heat transfer medium PF2 is circulated. The MCE element 12c provides a dividing wall that defines and divides the two passages, i.e., the low temperature passage 12f and the high temperature passage 12g. The dividing wall prevents mixture of the primary medium PF1 and the primary medium PF2. The dividing wall having a thin board shape extends at a position between the low temperature passage 12f and the high temperature passage 12g. The dividing wall provides a highly-efficient heat exchange between the primary medium PF1 and the primary medium PF2. When the primary medium PF1 has a high temperature that is higher than that of the primary medium PF2 (T1>T2), the dividing wall transfers heat from the primary medium PF1 to the primary medium PF2 by its own heat conduction.

The dividing wall further provides endothermic effects and exothermic effects, which absorbs and generates heat, respectively, based on the magneto-caloric effect. As a result, a heat transfer action is caused between the dividing wall and the primary medium PF1, the heat transfer action provided by an AMR cycle. Similarly, between the dividing wall and the primary medium PF2, a heat transfer action as an AMR cycle is caused. A part of heat absorbed from the primary medium PF1 radiates to the primary medium PF2 according to the magneto-caloric effect. As a result, the dividing wall, i.e., the MCE element 12c, transfers heat from the primary medium PF1 to the primary medium PF2, regardless of a relationship between temperature T1 of the primary medium PF1 and temperature T2 of the primary medium PF2. Therefore, even when temperature T1 of the primary medium PF1 is lower than temperature T2 of the primary medium PF2 (i.e., T1<T2), heat transfer from the primary medium PF1 to the primary medium PF2 occurs.

The MHP apparatus 11 in the present embodiment is considered to have two stages which are connected in series and share the MCE element 12c that is positioned between the low temperature end 1a and the high temperature end 1b. A first stage ST1 on the low temperature side has the MCE element 12a, the MCE element 12c, and the primary medium PF1 for low temperature. The first stage ST1 has a part of the magnetic field modulators 13 and a part of the heat transfer devices 14. A second state ST2 on the high temperature side has the MCE element 12b, the MCE element 12c, and the primary medium PF2 for high temperature. The second state ST2 has a part of the magnetic field modulators 13 and a part of the heat transfer devices 14.

The two stages ST1 and ST2 arranged in series share one MCE element 12c at least. Further, in this MCE element 12c, alternating layers of (i) the passage 12f that circulates the primary medium PF1 for low temperature and (ii) the passage 12g that circulates the primary medium PF2 for high temperature with a thin dividing wall interposed between the passage 12f and the passage 12g are formed in a stacking manner. As a result, a side-by-side (i.e., comingling) heat exchanging part in which the primary medium PF1 and the primary medium PF2 flow on both sides of a thin dividing wall is provided. Further, the MCE element 12c is equipped with multiple comingling heat exchanging parts.

Thereby, in the MCE element 12c, the heat transfer from the primary medium PF1 to the primary medium PF2 may be realized by the heat conduction of the dividing wall of the MCE element 12c in some cases. Further, the MCE element 12c exerts the magneto-caloric effect between the primary medium PF1 and the primary medium PF2. Therefore, in the MCE element 12c, the heat transfer from the primary medium PF1 to the primary medium PF2 is also provided by the magneto-caloric effect of the MCE element 12c. For example, the MCE element 12c radiates a part of the heat, which is absorbed from the primary medium PF1, to the primary medium PF2.

Figure 5:
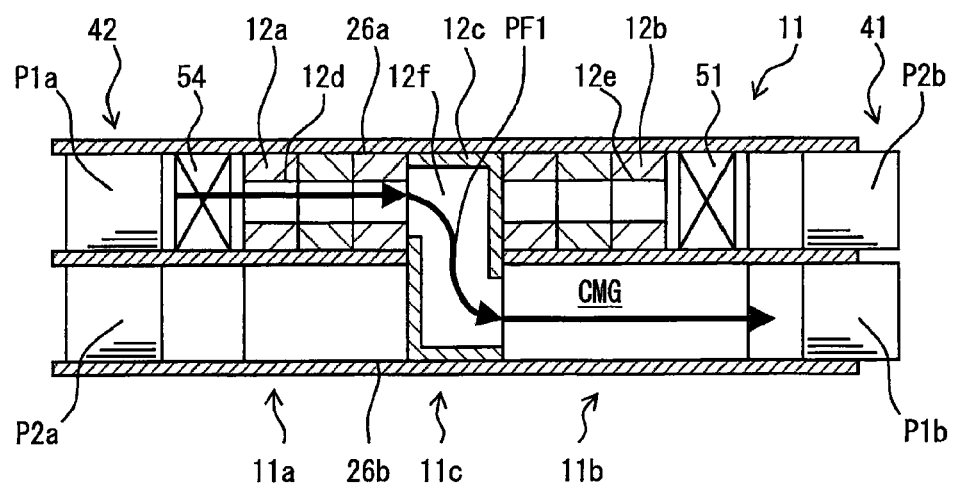
FIG. 5 is a sectional view of the MHP apparatus in the first embodiment.
Figure 6:
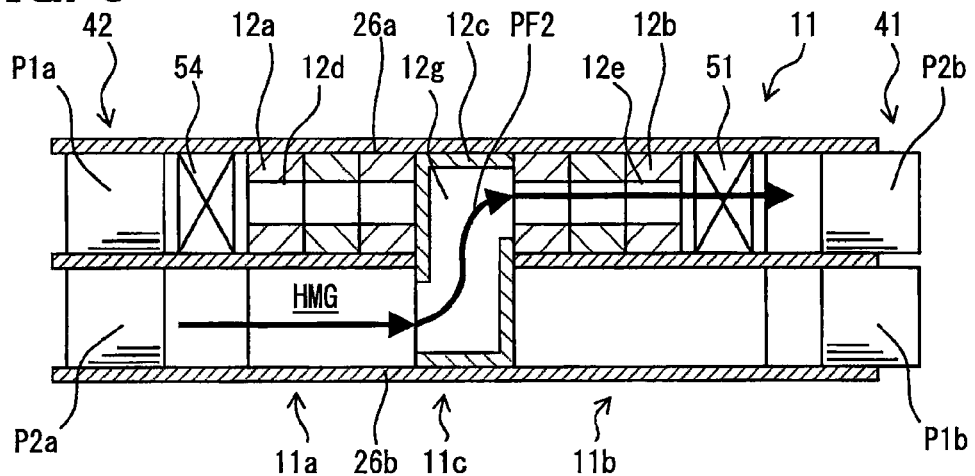
FIG. 6 is a sectional view of the MHP apparatus in the first embodiment.

FIG. 5 and FIG. 6 are sectional views of one set of the work chambers 26a and 26b of the MHP apparatus 11. FIGS. 5 and 6 illustrate, respectively, a "circular" cross section of the MHP apparatus 11 along at a certain radius from the center axis of the MHP apparatus 11.

As shown in FIG. 5, the MCE element 12c for the third unit 11c is provided with the passage 12f which communicates with the passage 12d and with the low temperature medium gallery CMG. The passage 12f is a flat passage, i.e., a so-called "micro channel." The passage 12f extends in a crank shape.

The MCE element 12c for the third unit 11c is provided with the passage 12g which communicates with the passage 12e and with the high temperature medium gallery HMG as shown in FIG. 6. The passage 12g is a flat passage, i.e., a so-called "micro channel." The passage 12g extends in a crank shape.

The third MCE element 12c has multiple first passages 12f, and multiple second passages 12g. The first passage 12f and the second passage 12g are arranged within the third magneto-caloric element and combined to make a comingling passage structure (i.e., an intersecting/overlapping layered passage structure) in which the passages 12f and 12g share one dividing wall interposed therebetween, i.e., the passages 12f and 12g are positioned on both sides of one dividing wall, with a thermal connection devised therethrough. The first passage 12f and the second passage 12g are combined or layered to provide multiple comingling passage structures. More practically, multiple first passages 12f and multiple second passages 12g are arranged in layers by turns, in an alternating manner. In other words, the multiple first passages 12f and multiple second passages 12g are arranged in alternating layers. The cross section shape of the passages 12f and 12g is a flat rectangular shape (i.e., having a thin rectangular cross-sectional shape), for example, in which a long side of the rectangular cross section shape extends perpendicularly to a layer-stacking direction of those passages 12f and 12g (as shown in FIG. 7).

The heat transfer device 14 has, as illustrated, the housing 21 which forms at least two work chambers 26a and 26b. The heat transfer device 14 has a first pump, i.e., a cylinder P1a and a cylinder P1b, which is positioned on each of both ends of the work chambers 26a and 26b in which the first MCE element 12a and the third MCE element 12c are positioned/housed, for a reciprocal circulation of the first heat transfer medium PF1. The heat transfer device 14 also has a second pump, i.e., a cylinder P2a and a cylinder P2b, which is positioned on each of both ends of the work chambers 26a and 26b in which the second MCE element 12b and the third MCE element 12c are positioned/housed, for a reciprocal circulation of the second heat transfer medium PF2.

As illustrated, two cylinders P1a, P2a of the pump 42 which are respectively associated with the low temperature end 1a of the first work chamber 26a and the low temperature end 1a of the second work chamber 26b have (i.e., operate in) the same phase, substantially. Further, two cylinders P1b, P2b of the pump 41 which are respectively associated with the high temperature end 1b of the first work chamber 26a and the high temperature end 1b of the second work chamber 26b have (i.e., operate in) the same phase, substantially. Two cylinders P1b, P2b of the pump 41 and two cylinders P1a and P2a of the pump 42 face with each other (i.e., in an opposed relationship). These two cylinders in the facing relationship have (i.e., operate in) the opposite phase, substantially. The two facing cylinders (e.g., P1a, P1b in FIG. 5) have (i.e., operate in) the opposite phase for circulating the primary medium PF1, PF2 in one unit 11a or in one unit 11b.

Figure 7:
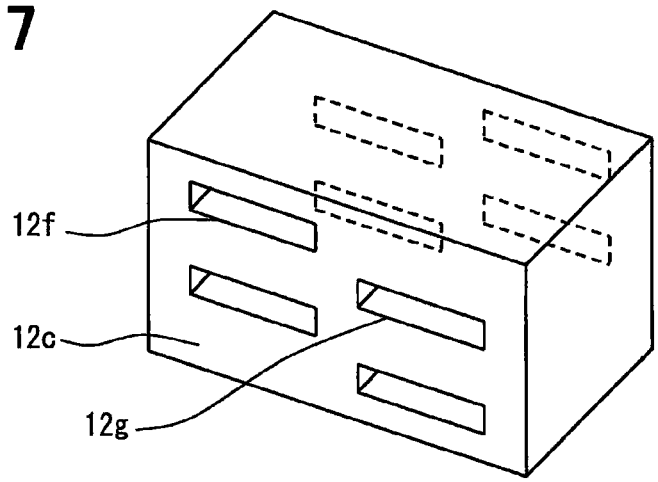
FIG. 7 is a perspective view of a heat-transfer element in the first embodiment.
Figure 8:
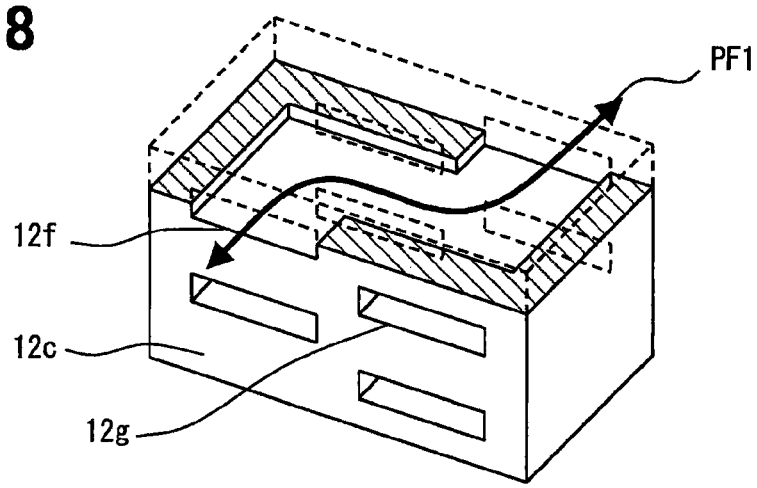
FIG. 8 is a perspective view of a cross section of the heat-transfer element in the first embodiment.
Figure 9:
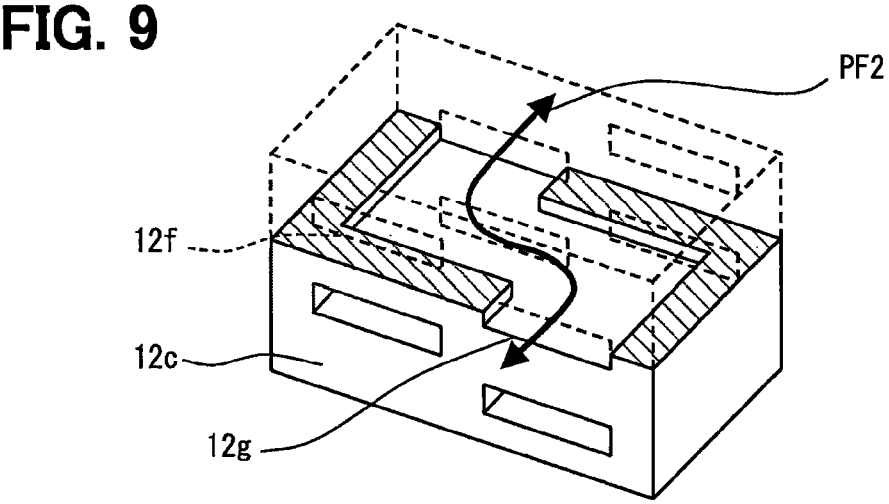
FIG. 9 is a perspective view of the cross section of the heat-transfer element in the first embodiment.

FIG. 7, FIG. 8, FIG. 9 are schematic perspective views of the MCE element 12c. FIG. 8 and FIG. 9 partially include a cross section of the MCE element 12c, respectively.

As seen in the drawing, regarding the passage 12f, which circulates the primary medium PF1 of the first unit 11a, one opening of the passage 12f opens in a region corresponding to the first work chamber 26a. The other opening of the passage 12f opens in a region corresponding to the second work chamber 26b. Regarding the passage 12g, which circulates the primary medium PF2 of the second unit 11b, one opening of the passage 12g opens in a region corresponding to the second work chamber 26b, and the other opening of the passage 12g opens in a region corresponding to the first work chamber 26a.

The MCE element 12c serving as the third unit 11c has multiple passages 12f for circulating the primary medium PF1 for the first unit 11a, and also has multiple passages 12g for circulating the primary medium PF2 for the second unit 11b. The passages 12f and 12g are provided in a large number. At a position between the passage 12f and the passage 12g, a thin dividing wall is provided by the MCE element 12c. Multiple passages 12f and multiple passages 12g are stacked in a layered manner in the MCE element 12c. Thereby, the heat exchange through the heat transfer of the dividing wall is enabled in a large area.

When an electric power is supplied to the motor 15, the motor 15 rotates the rotation shaft 22. By the rotation of the rotation shaft 22, the magnetic field modulator 13 cyclically switches the magnetic field applied to the MCE element 12 between an applying state and a removal state. The MCE element 12 repeats heat generation and heat absorption according to an application and a removal of the magnetic field. By the rotation of the rotation shaft 22, the pumps 41 and 42 produce the reciprocal flow of the primary media PF1 and PF2. The primary medium PF1 exchanges heat with the MCE element 12a. As a result, the MCE element 12a and the primary medium PF1 function as an AMR cycle, and transfer heat to the middle-low temperature end 1c from the low temperature end 1a. The primary medium PF2 exchanges heat with the MCE element 12b. As a result, the MCE element 12b and the primary medium PF2 function as an AMR cycle, and transfer heat to the high temperature end 1b from the middle-high temperature end 1d.

The MCE element 12c exchanges heat with both of the primary medium PF1 and the primary medium PF2. The MCE element 12c provides the passive heat transfer between the primary medium PF1 and the primary medium PF2 by heat conduction. For example, when temperature T1 of the primary medium PF1 and temperature T2 of the primary medium PF2 have a relationship T1>T2, the MCE element 12c provides the heat transfer from the primary medium PF1 to the primary medium PF2 by the heat conduction of the MCE element 12c.

Further, the MCE element 12c repeats heat generation and heat absorption corresponding to an application and a removal of the magnetic field. At this time, the MCE element 12c provides the active heat transfer between the first heat transfer medium and the second heat transfer medium according to the magneto-caloric effect. For example, the MCE element 12c radiates, to the primary medium PF2, at least a part of heat that has been absorbed from the primary medium PF1. As a result, the MCE element 12c provides the active heat transfer from the primary medium PF1 to the primary medium PF2 according to the magneto-caloric effect. As a result, the MCE element 12c serving as the third unit 11c provides the heat transfer from the primary medium PF1 to the primary medium PF2 according to both of the heat conduction and the magneto-caloric effect.

When the MHP apparatus 11 functions as an AMR cycle, temperature of the high temperature system 16 rises and temperature of the low temperature system 17 falls. When the air-conditioner 10 for vehicles is used as a heater, the air-conditioner 10 provides the heat pump effect for warming the room temperature by using, as a heat source, the open/ambient air that has low temperature.

As illustrated in FIG. 1, when temperature TC of the low temperature end 1a is the temperature of the open/outside air, the high temperature end 1b is provided with temperature TH by the MHP apparatus 11. In a stable operational state, the MCE element 12c serving as the third unit 11c provides the heat transfer from the middle-low temperature end 1c to the middle-high temperature end 1d. The MCE element 12c enables the heat transfer between the two ends 1c and 1d, even when temperature T1 of the middle-low temperature end 1c and temperature T2e of the middle-high temperature end 1d has a relationship T1<T2e. In the present embodiment, a large temperature difference is provided between the low temperature end 1a and the high temperature end 1b.

Second Embodiment

This embodiment is a modification based on the preceding one. According to the above-described embodiment, one unit (e.g., the third unit 1c) is provided at a position between one cylinder of the pump 41 and one cylinder of the pump 42. Instead, in the present embodiment, the MHP apparatus 11 has one unit provided at a position between two cylinders of one pump.

Figure 10:
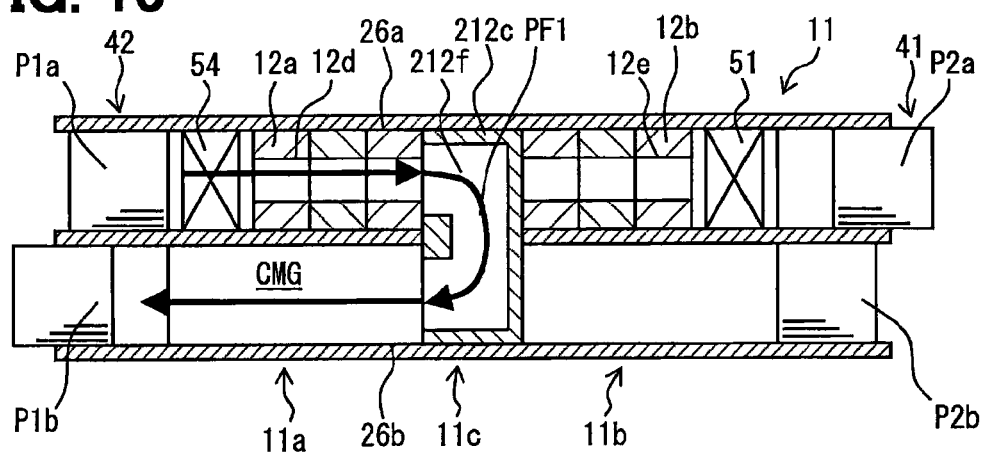
FIG. 10 is a sectional view of the MHP apparatus in a second embodiment of the present disclosure.
Figure 11:
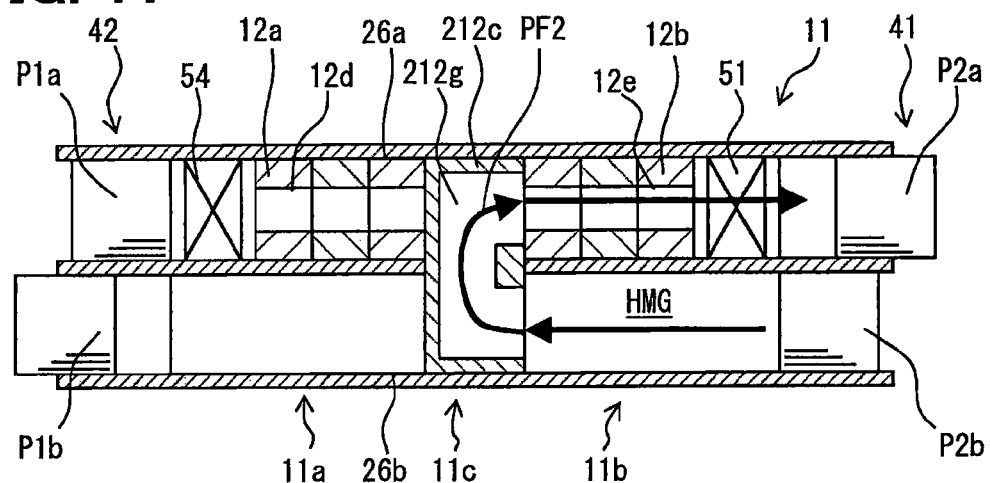
FIG. 11 is a sectional view of the MHP apparatus in the second embodiment.
Figure 12:
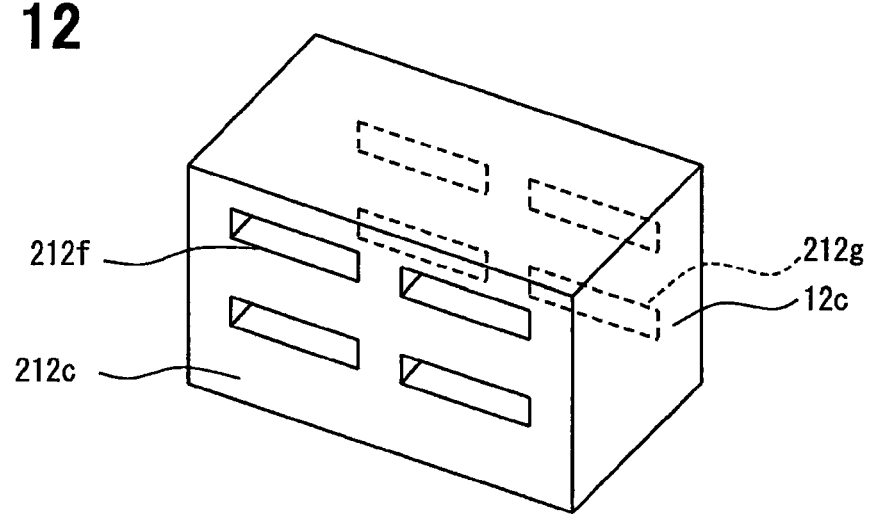
FIG. 12 is a perspective view of the heat-transfer element in the second embodiment.
Figure 13:
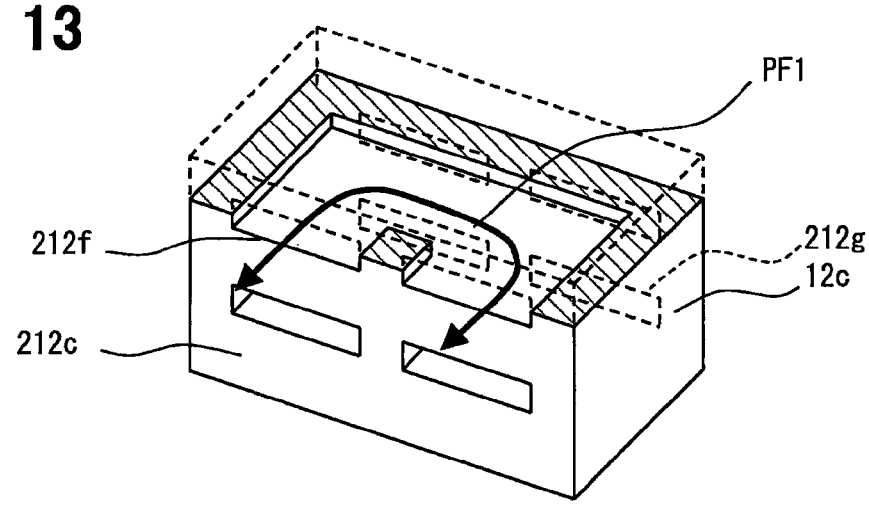
FIG. 13 is a perspective view of the cross section of the heat-transfer element in the second embodiment.
Figure 14:
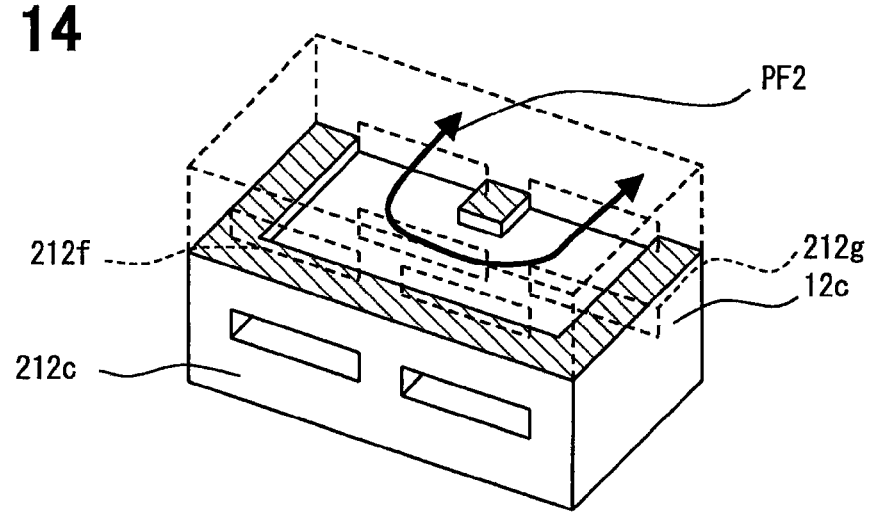
FIG. 14 is a perspective view of the cross section of the heat-transfer element in the second embodiment.

FIG. 10 and FIG. 11 are sectional views corresponding to FIG. 5 and FIG. 6. FIG. 12, FIG. 13, and FIG. 14 are sectional views corresponding to FIG. 7, FIG. 8, and FIG. 9.

The first unit 11a is disposed at a position between one cylinder of the pump 42 and the other cylinder of the pump 42 as shown in the drawing. Further, the second unit 11b is disposed at a position between one cylinder of the pump 41 and the other cylinder of the pump 41. In such configuration, the (two) cylinders on both ends of one unit have opposite phases, which are opposite to each other. An MCE element 212c which serves as the third unit 11c has passages 212f and 212g of U character shape or bracket shape.

The low temperature medium gallery CMG is disposed on the low temperature side of the third unit 11c. According to such configuration, heat dissipation/radiation (i.e., escaping heat) from the high temperature end 1b to the low temperature medium gallery CMG is reduced. The high temperature medium gallery HMG is disposed on the high temperature side of the third unit 11c. According to such configuration, heat dissipation/radiation (i.e., escaping heat) from the high temperature medium gallery HMG to the low temperature end 1a is reduced.

Third Embodiment

Figure 15:
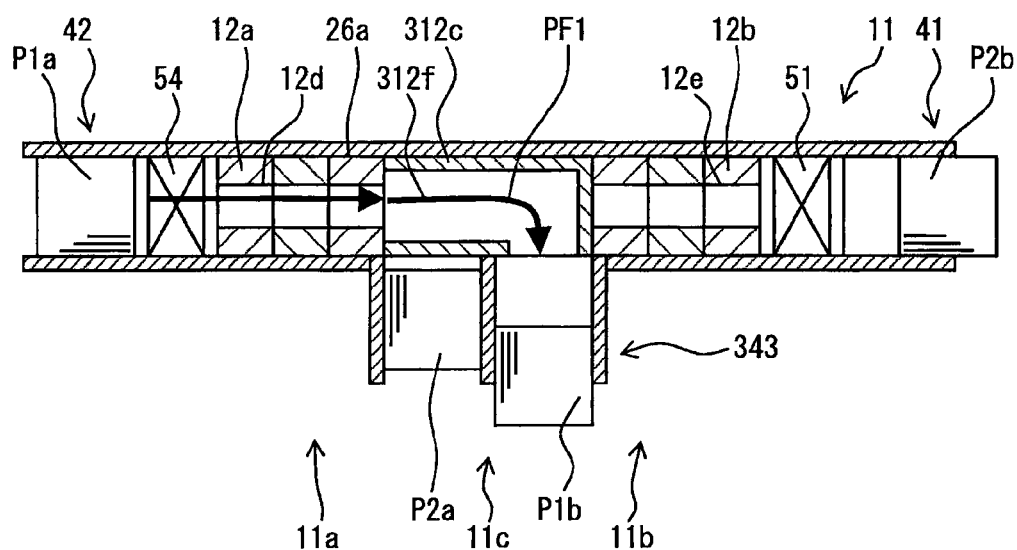
FIG. 15 is a sectional view of the MHP apparatus in a third embodiment of the present disclosure.
Figure 16:
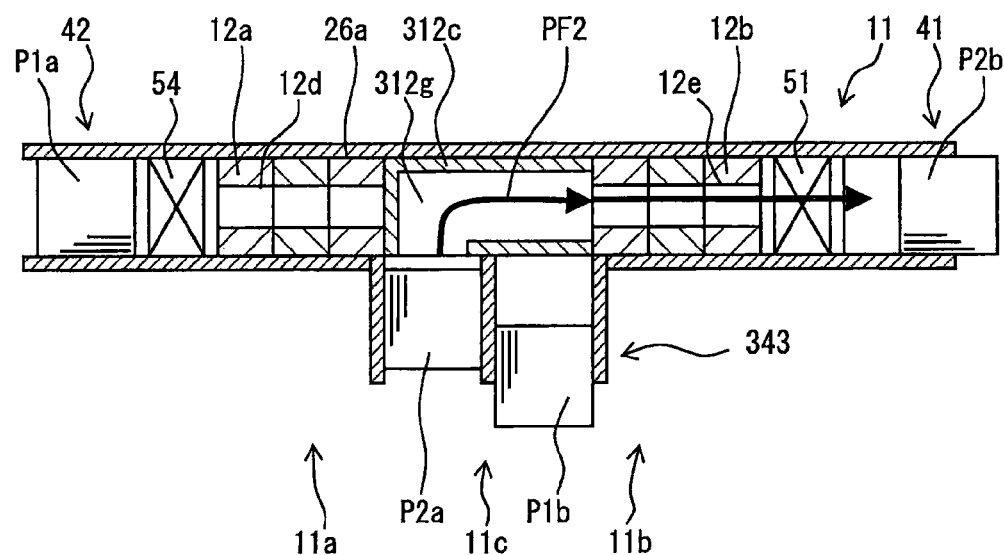
FIG. 16 is a sectional view of the MHP apparatus in the third embodiment.
Figure 17:
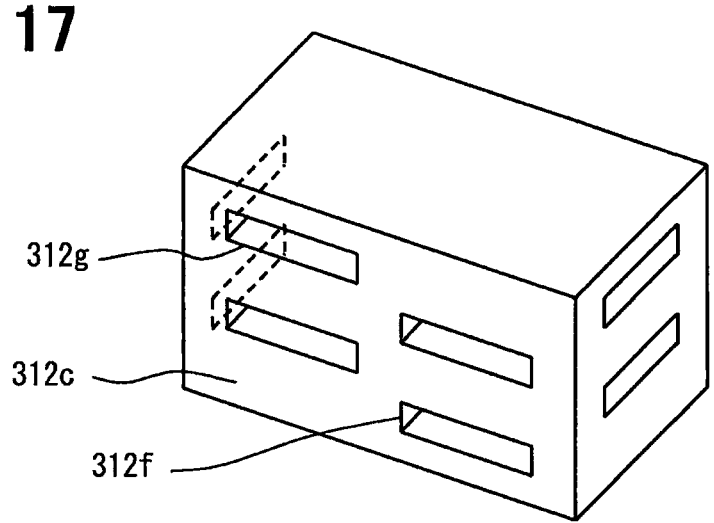
FIG. 17 is a perspective view of the heat-transfer element in the third embodiment.
Figure 18:
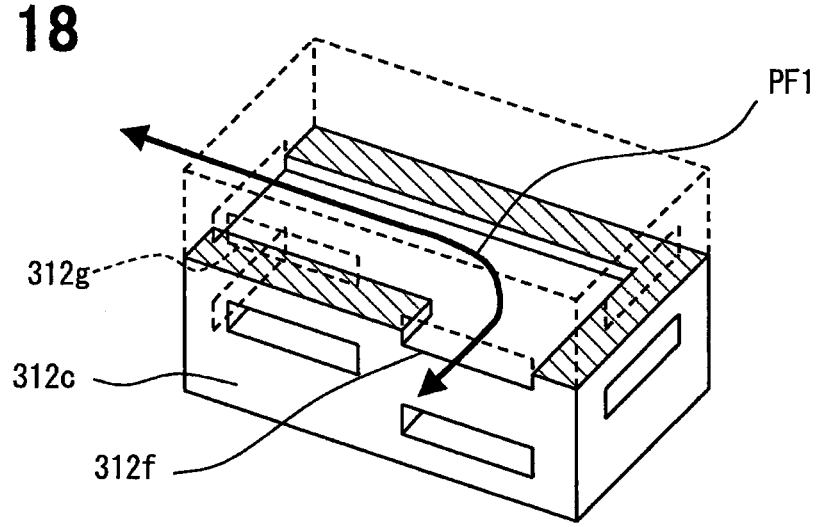
FIG. 18 is a perspective view of the cross section of the heat-transfer element in the third embodiment.
Figure 19:
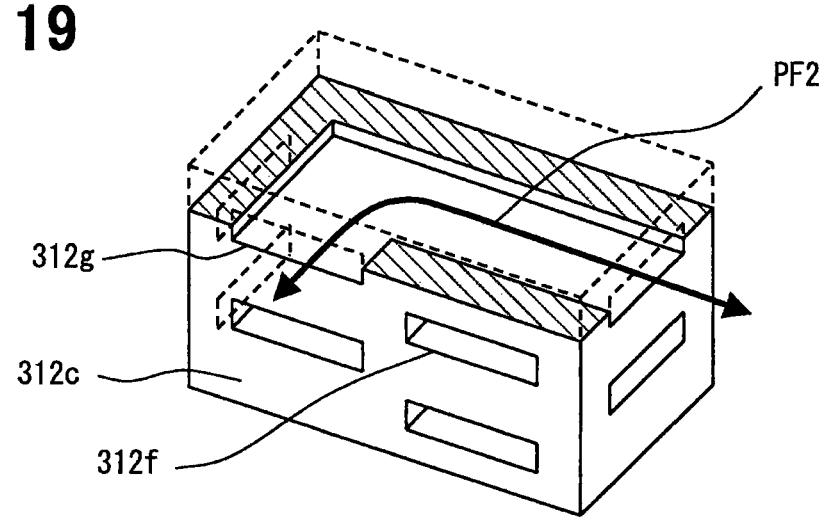
FIG. 19 is a perspective view of the cross section of the heat-transfer element in the third embodiment.

This embodiment is a modification based on the preceding one. According to the above-described embodiment, the pumps 41 and 42 are disposed on both ends of the MHP apparatus 11, and the first unit 11a and the second unit 11b are provided in a set of work chambers 26a and 26b. Instead, in the present embodiment, the MHP apparatus 11 has an additional pump 343 at an intermediate position. FIG. 15 and FIG. 16 are sectional views corresponding to FIG. 5 and FIG. 6. FIG. 17, FIG. 18, and FIG. 19 are sectional views corresponding to FIG. 7, FIG. 8, and FIG. 9.

The first unit 11a is disposed at a position between one cylinder of the pump 42 and one cylinder of the additional pump 343 as shown in the drawing. The (two) cylinders positioned on both ends of the first unit 11a have opposite phases, which are opposite to each other. The second unit 11b is disposed at a position between one cylinder of the pump 41 and one cylinder of the additional pump 343. The (two) cylinders positioned on both ends of the second unit 11b have opposite phases, which are opposite to each other. The pump 343 may be provided as a radial-piston pump which has a cam and multiple cylinders arranged on an outside of the cam, for example. The MCE element 312c which serves as the third unit 11c has passages 312f and 312g of L character shape.

According to such configuration, two units 11a and 11b may be disposed in one work chamber 26, without using half of one work chamber 26 only as a gallery which circulates the primary medium.

Fourth Embodiment

Figure 20:
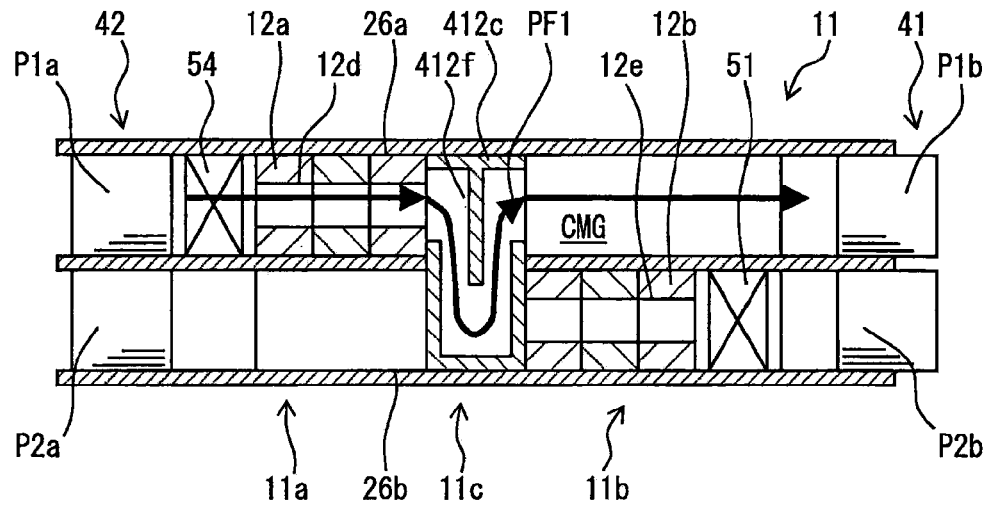
FIG. 20 is a sectional view of the MHP apparatus in a fourth embodiment of the present disclosure.
Figure 21:
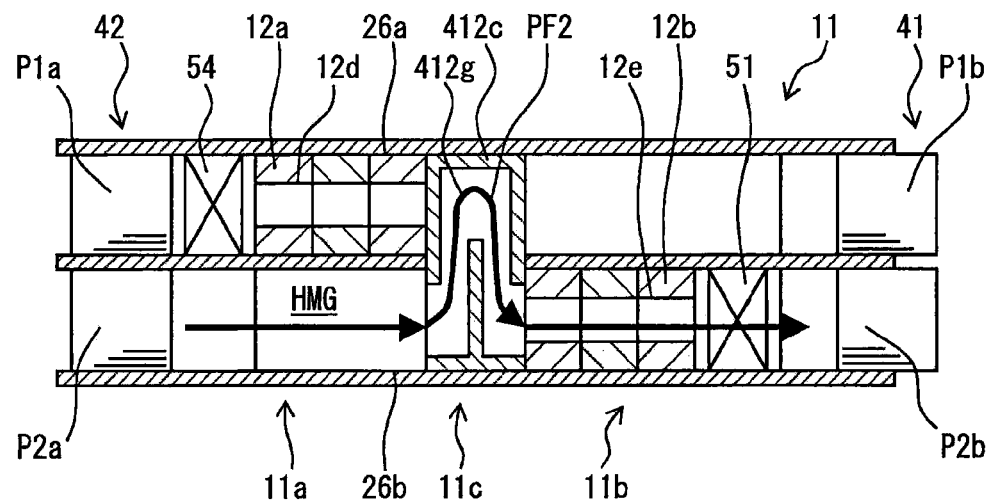
FIG. 21 is a sectional view of the MHP apparatus in the fourth embodiment.

This embodiment is a modification based on the preceding one. According to the above-described embodiment, the MCE element 12a of the first unit 11a and the MCE element 12b of the second unit 11b are disposed in one work chamber 26a of the MHP apparatus 11. Instead, in the present embodiment, the MHP apparatus 11 is provided with the MCE element 12a of the first unit 11a in one work chamber 26a, and is provided with the MCE element 12b of the second unit 11b in the other work chamber 26b. FIG. 20 and FIG. 21 are sectional views corresponding to FIG. 5 and FIG. 6.

The first unit 11a has the MCE element 12a disposed in one of two halves of the first work chamber 26a, and the low temperature medium gallery CMG disposed in the other half of the same work chamber 26a as shown in the drawing. The second unit 11b has the MCE element 12b disposed in one of two halves of the second work chamber 26b, and the high temperature medium gallery HMG disposed in the other half of the same work chamber 26b. An MCE element 412c which serves as the third unit 11c has "omega $\Omega$" shape passages 412f and 412g.

According to such configuration, long passages 412f and 412g are disposed in the MCE element 412c, and heat transfer between the primary medium PF1 and the primary medium PF2 is increased.

Fifth Embodiment

Figure 22:
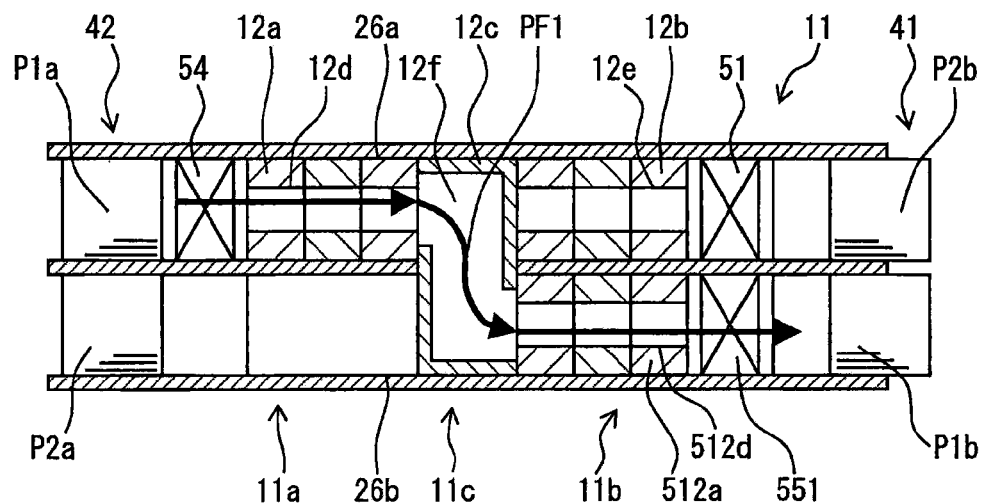
FIG. 22 is a sectional view of the MHP apparatus in a fifth embodiment of the present disclosure.
Figure 23:
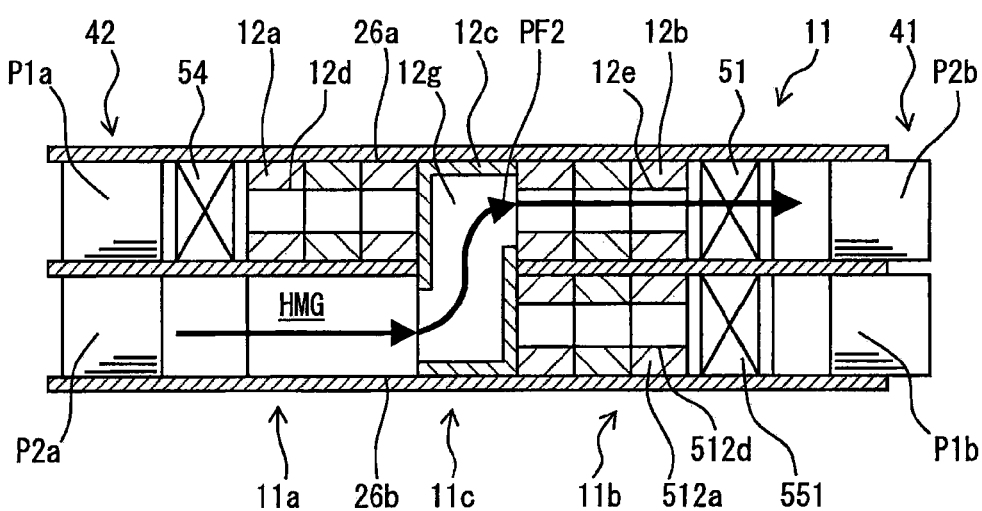
FIG. 23 is a sectional view of the MHP apparatus in the fifth embodiment.

This embodiment is a modification based on the preceding one. According to the above-described embodiment, the first temperature zone RG1 assigned to the first unit 11a and the second temperature zone RG2 assigned to the second unit 11b are provided as two separate zones from each other on the low temperature side and on the high temperature side, without any overlapping. Instead, in the present embodiment, the first temperature zone RG1 assigned to the first unit 11a and the second temperature zone RG2 assigned to the second unit 11b overlap with each other. Further, those temperature zones RG1 and RG2 overlap on the high temperature side at which the high temperature end 1b is disposed. In other words, the first unit 11a takes charge of the third temperature zone RG3, i.e., an "expanded" first temperature zone RG1 which expands and spreads beyond a middle temperature zone. As a result, the thermal capacity of the high temperature side half is larger than the thermal capacity of the low temperature side half. FIG. 22 and FIG. 23 are sectional views corresponding to FIG. 5 and FIG. 6.

The first unit 11a has an MCE element 512a as shown in the drawing in the inside of the second work chamber 26b, i.e., in the low temperature medium gallery CMG in the preceding embodiment. The MCE element 512a is an element which provides a high magneto-caloric effect in the second temperature zone RG2. The MCE element 512a may be provided as the same element as the MCE element 12b, for example. The MCE element 512a has a passage 512d for the primary medium PF1.

Further, corresponding to the second work chamber 26b, a heat exchanger 551 of the high temperature system 16 is provided. A heat exchanger 551 supplies heat to the high temperature system 16 from the primary medium PF1 by exchanging heat with the primary medium PF1 at the high temperature end 1b.

According to such configuration, at the low temperature end 1a, heat is supplied only to the first unit 11a from the heat exchanger 54. Further, in a section between the low temperature end 1a and the middle-low temperature end 1c, only the first unit 11a provides a heat pump effect.

The MCE element 12c which serves as the third unit 11c is disposed in the section between the middle-low temperature end 1c and the middle-high temperature end 1d. The MCE element 12c, serving as an element of the first unit 11a, collaborates with the primary medium PF1 and provides the AMR cycle. Further, the MCE element 12c functions as a heat exchanger which exchanges heat between the primary medium PF1 and the primary medium PF2 based on heat conduction, just like the preceding embodiment. At the same time, the MCE element 12c radiates a part of the heat to the primary medium PF2 which has been absorbed from the primary medium PF1 based on the magneto-caloric effect. Thus, as described above, the third unit 11c connects a low temperature side portion of the first unit 11a and the second unit 11b in series.

On the other hand, in a section between the middle-high temperature end 1d and the high temperature end 1b, both of the first unit 11a and the second unit 11b exert a heat pump effect. Further, at the high temperature end 1b, heat is supplied to the high temperature system 16 from both of the primary medium PF1 and the primary medium PF2. Therefore, in the section between the middle-high temperature end 1d and the high temperature end 1b, the heat pump effect is provided while reducing heat dissipation/radiation (i.e., escaping heat). Thus, a highly efficient heat pump operation is realized by having the heat transfer capacity heightened/increased on the high temperature side relative to the capacity on the low temperature side.

Other Embodiments

Without being restricted to the above embodiments for realizing the present disclosure in any way, various modifications of the present disclosure described in this application should be considered to be within the scope of the inventive idea. The disclosed idea may be variously combined, without being restricted to any combination in the embodiments. The embodiment can have an additional portion. The embodiment may have an omitted portion. The embodiment may be partially replaceable, or may be partially combinable with other embodiment, or with a part of other embodiment. The structure of the embodiment, as well as the action and the effect described therein are an example only. The technical scope of the present disclosure described therein is not strictly limited to a statement in the embodiment. Some of the technical scopes of the present disclosure may be shown in a recitation of the claim, and also may be understood as including any change and/or modification within an equivalence of an intended meaning and/or a breadth of such meaning.

In the above-described embodiment, the multi-cylinder pump is realized as a swash-plate type piston pump, a radial-piston pump or the like. Instead, other type of positive-displacement type reciprocal flow pump may be realized by the present disclosure.

Further, in the first embodiment described above, one cylinder in the pump corresponds to one work room. Instead, multiple cylinders may correspond to one work room, or one cylinder may correspond to multiple work rooms, or multiple cylinders may correspond to multiple work rooms.

In the above-described embodiment, the present disclosure is applied to an air-conditioner for vehicles. Instead, the present disclosure may be applied to an air-conditioner for homes. Further, the present disclosure may be used as a hot water supply device which heats water.

The above-described embodiment describes the MHP apparatus 11 uses open air as a main heat source. Instead, other objects such as water, soil may also be used as a main heat source.

In the above-described embodiment, the present disclosure describes the MHP apparatus 11 as one of thermo-magnetism cycle apparatuses. Instead, the present disclosure may be applied to a thermo-magnetism engine device which is also one of the thermo-magnetism cycle apparatuses. For example, a thermo-magnetism engine device may be provided by appropriately adjusting the phase of the magnetic field change of the MHP apparatus 11 to the phase of the flow of the heat transfer medium in the above-mentioned embodiment.

According to the above-described embodiment, many passages 12d and 12e designated as micro channels are provided in the MCE elements 12a and 12b. Instead, many round holes or many square holes may be used as the passages in the MCE elements. Further, the MCE elements 12a and 12b may be provided as a porosity device in which the heat transfer medium is circulatable/flowable.

In the above-described embodiment, the thermo-magnetism cycle apparatus is described as a two-stage apparatus in which two units 11a and 11b are connected in series. The present disclosure may also be realized as more-than two stage thermo-magnetism cycle apparatus, in which three, four, or more staged units may be connected in series.

According to the above-described embodiment, the MCE elements 12c, 212c, 312c, and 412c are provided in the third unit 11c. Instead, a heat exchanger with the same shape as the MCE elements 12c, 212c, 312c, or 412c may be provided. Such heat exchanger may be made with metal, e.g. a material having a high thermal conductivity, such as copper, aluminum, iron or the like.

In such configuration, a heat exchanger 12c is disposed at a position between the first MCE element 12a and the second MCE element 12b. This heat exchanger 12c has multiple first passages 12f in which the first heat transfer medium PF1 is circulated, and multiple second passages 12g in which the second heat transfer medium PF2 is circulated. The first passage 12f and the second passage 12g are arranged to share the dividing wall to make an adjacent/comingling passage structure. Further, those passages 12f and 12g may make multiple sets of the adjacent/comingling passage structure which is realized in a layered manner. Thereby, heat exchange between the primary medium PF1 for low temperature and the primary medium PF2 for high temperature is realized/performed with nominal heat loss.

Although the present disclosure has been fully described in connection with preferred embodiment thereof with reference to the accompanying drawings, it is to be noted that various changes and modifications will become apparent to those skilled in the art, and such changes, modifications, and summarized schemes are to be understood as being within the scope of the present disclosure as defined by appended claims.

What is claimed is:

1. A thermo-magnetism cycle apparatus comprising:
a magneto-caloric element having a low-temp end and a high-temp end, the low-temp end disposed opposite to the high-temp end;
a heat transfer device that reciprocally flows a heat transfer medium inside of the magneto-caloric element to transfer heat between the heat transfer medium and the magneto-caloric element; and
a magnetic field modulator that reciprocally applies and removes a magnetic field to the magneto-caloric element in synchronization with reciprocal flowing of the heat transfer medium, wherein
the magneto-caloric element includes a first magneto-caloric element, a second magneto-caloric element disposed on a high-temp side of the first magneto-caloric element, and a third magneto-caloric element disposed at a position between the first and second magneto-caloric elements,
the heat transfer medium includes a first heat transfer medium that exchanges heat with the first magneto-caloric element, and a second heat transfer medium that exchanges heat with the second magneto-caloric element, the first heat transfer medium and the second heat transfer medium provided as two respectively different media,
the third magneto-caloric element includes a first passage through which the first heat transfer medium flows, and a second passage through which the second heat transfer medium flows,
heat is both passively transferred between the first and second heat transfer medium through heat conduction and actively transferred between the first and second heat transfer medium through a magneto-caloric effect;
the third magneto-caloric element has a plurality of first passages and a plurality of second passages,
the plurality of first passages and the plurality of second passages are arranged within the third magneto-caloric element to share an in-between dividing wall and form a comingling passage structure that creates a non-linear flow direction passage, and
the plurality of first passages and the plurality of second passages are layered to form a plurality of comingling passage structures.

2. The thermo-magnetism cycle apparatus of claim 1, wherein
the first magneto-caloric element, the third magneto-caloric element, and the second magneto-caloric element are arranged in series between the low-temp end and the high-temp end.

3. The thermo-magnetism cycle apparatus of claim 1, wherein
the first magneto-caloric element, the third magneto-caloric element, and the second magneto-caloric element are heat-transferably connected between the low-temp end and the high-temp end.

4. The thermo-magnetism cycle apparatus of claim 1, wherein
the plurality of first passages and the plurality of second passages are arranged in alternating layers.

5. The thermo-magnetism cycle apparatus of claim 1, wherein
the first passage and the second passage have a rectangular cross-sectional shape.

6. The thermo-magnetism cycle apparatus of claim 1, wherein
the heat transfer device includes
a first pump disposed on both ends of a first work chamber that houses the first magneto-caloric element and the third magneto-caloric element, the first pump providing reciprocal flow of the first heat transfer medium, and
a second pump disposed on both ends of a second work chamber that houses the second magneto-caloric element and the third magneto-caloric element, the second pump providing reciprocal flow of the second heat transfer medium.

7. The thermos-magnetism cycle apparatus of claim 1, wherein the comingling passage structure is an intersecting/overlapping layered passage structure.

8. A thermo-magnetism cycle apparatus comprising:
- a magneto-caloric element having a low-temp end and a high-temp end, the low-temp end disposed opposite to the high-temp end;
- a heat transfer device that reciprocally flows a heat transfer medium inside of the magneto-caloric element to transfer heat between the heat transfer medium and the magneto-caloric element; and
- a magnetic field modulator that reciprocally applies and removes a magnetic field to the magneto-caloric element in synchronization with reciprocal flowing of the heat transfer medium, wherein
- the magneto-caloric element includes a first magneto-caloric element, a second magneto-caloric element disposed on a high-temp side of the first magneto-caloric element, and
- the heat transfer device includes a first heat transfer medium that exchanges heat with the first magneto-caloric element, a second heat transfer medium that exchanges heat with the second magneto-caloric element, the first heat transfer medium and the second heat transfer medium provided as two respectively different media, and a heat exchanger disposed at a position between the first and second magneto-caloric element, the heat exchanger including a first passage through which the first heat transfer medium flows, and a second passage through which the second heat transfer medium flows, wherein
- the first passage and the second passage are arranged side-by-side within the heat exchanger and combined to form a comingling passage structure that creates a non-linear flow direction passage with a dividing wall interposed between the first passage and the second passage, and the first passage and the second passage are layered to form a plurality of comingling passage structures.

9. The thermos-magnetism cycle apparatus of claim 8, wherein the comingling passage structure is an intersecting/overlapping layered passage structure.

* * * * *